United States Patent [19]

Matsumura et al.

[11] Patent Number: 4,511,957
[45] Date of Patent: Apr. 16, 1985

[54] POWER CONVERTER

[75] Inventors: Susumu Matsumura; Mitsumasa Imataki, both of Hyogo, Japan

[73] Assignee: Susumu Matsumura and Mitsubishi Denki Kabushiki Kaisha, Tokyo, Japan

[21] Appl. No.: 508,290

[22] Filed: Jun. 27, 1983

[30] Foreign Application Priority Data

Jul. 12, 1982 [JP] Japan .................. 57-120844

[51] Int. Cl.³ .......................................... H02H 7/125
[52] U.S. Cl. ........................................ 363/54; 363/68; 361/124
[58] Field of Search ............... 363/52, 53, 54, 67, 363/68; 307/252 K, 252 L, 252 Q; 361/55, 56, 57, 91, 100, 104, 111, 124

[56] References Cited

U.S. PATENT DOCUMENTS

| 4,132,915 | 1/1979 | Wilms ........................ 361/124 |
| 4,191,987 | 3/1980 | Coren ........................ 361/124 |
| 4,282,568 | 8/1981 | Kobayashi et al. .............. 363/68 |

FOREIGN PATENT DOCUMENTS

| 2233253 | 7/1972 | Fed. Rep. of Germany ...... 361/111 |
| 2621074 | 5/1976 | Fed. Rep. of Germany ...... 361/124 |
| 2911110 | 9/1980 | Fed. Rep. of Germany ...... 361/124 |

Primary Examiner—Peter S. Wong
Assistant Examiner—Judson H. Jones
Attorney, Agent, or Firm—Bernard, Rothwell & Brown

[57] ABSTRACT

A power converter adapted for use in a high-voltage circuit and equipped with a plurality of arms each comprising a plurality of thyristor elements connected in series, wherein an overvoltage limiter having an overvoltage limiting element and means for short-circuiting the ends of the overvoltage limiting element in response to flow of a load current therein are connected between the anode and the cathode of each thyristor element. The short-circuiting means has a gap between the two electrodes connected respectively to the anode and the cathode of each thyristor element, and also a metal layer of a low melting point which is molten by heat generated due to the flow of a load current in the overvoltage limiting element to fill the gap.

4 Claims, 5 Drawing Figures

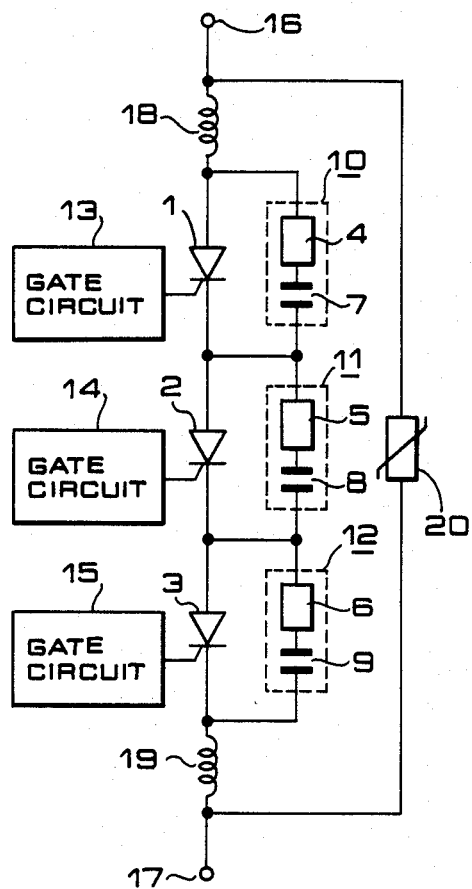
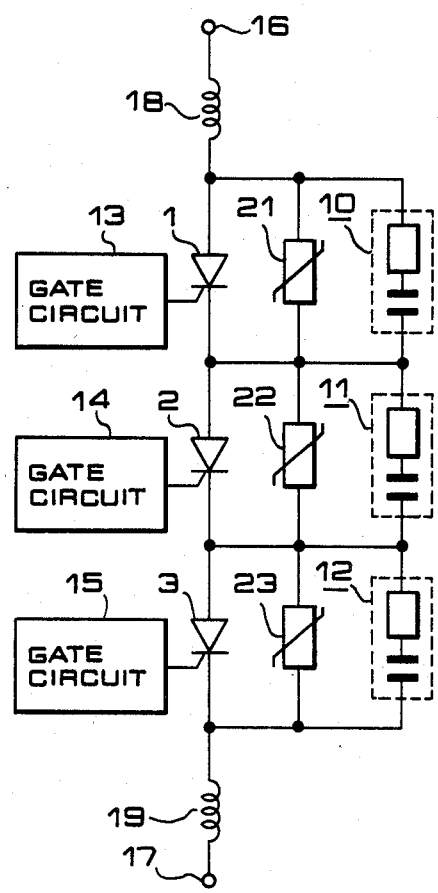
FIG. 1
(PRIOR ART)
FIG. 2
(PRIOR ART)

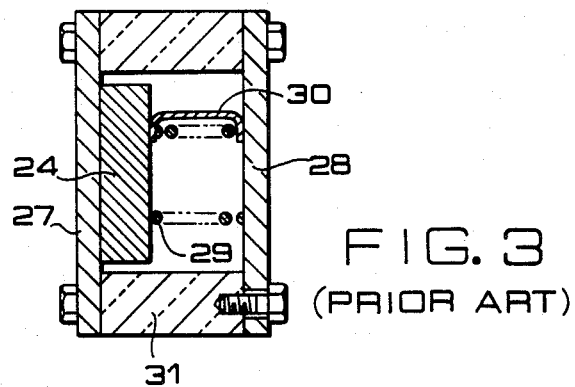
FIG. 3
(PRIOR ART)
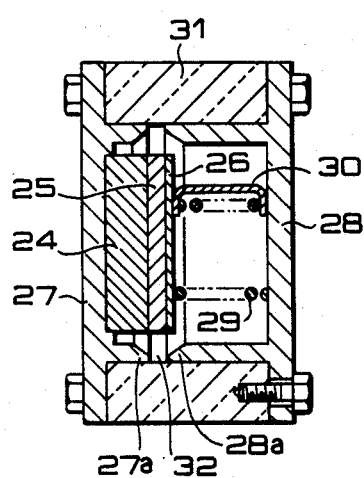 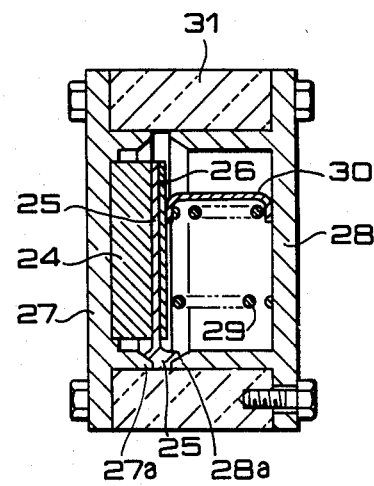
FIG. 4    FIG. 5

POWER CONVERTER

BACKGROUND OF THE INVENTION

1. Field of the Invention

The present invention relates to a power converter equipped with a plurality of thyristor elements connected in series with one another.

2. Description of the Prior Art

A power converter circuit for use in a high-voltage circuitry comprises a plurality of arms each consisting of a stack having a plurality of series-connected thyristor elements. The number of the thyristor elements of each arm is determined on the basis of a normal operating voltage. Other factors concerned with determining the number of the series-connected thyristor elements include an on-off impulse voltage applied sporadically and a lightning impulse voltage, which are also to be taken into consideration. However, since such impulse voltages are limited by an arrester connected in parallel with each arm, it is preferred in view of economy that the number of thyristor elements in each arm be determined in accordance with the limiting voltage of the arrester.

FIG. 1 shows the circuit configuration of one arm in a conventional power converter. In this structure, a series circuit consisting of three thyristor elements 1, 2 and 3 is connected at its one end to an anode terminal 16 via a reactor 18 while being connected at its other end to a cathode terminal 17 via a reactor 19. Gate circuits 13, 14 and 15 are provided to control the thyristor elements 1, 2 and 3, respectively. A snubber circuit 10 consisting of a resistor 4 and a capacitor 7 is connected between the anode and cathode of the thyristor element 1. Similarly, a snubber circuit 11 consisting of a resistor 5 and a capacitor 8 is connected between the anode and cathode of the thyristor element 2, and also another snubber circuit 12 consisting of a resistor 6 and a capacitor 9 between the anode and cathode of the thyristor element 3. An arrester 20 is connected between the terminals 16 and 17. Although it is customary in general to employ a gapless arrester composed of zinc oxide, an ordinary arrester with a gap is also used in some cases.

When none of the thyristor elements is faulty in the circuit configuration of FIG. 1, the voltage applied to each thyristor element is expressed as $V_M/N$, where $V_M$ is the limit voltage of the arrester and N the total number of the thyristor elements employed. But in case that i (positive integer smaller than N) pieces of the thyristor elements are rendered faulty, the voltage becomes higher to a value expressed by $V_M/N-i$ to eventually increase the possibility of causing damage to the other thyristor elements in normal operation. In order to avoid such a trouble, it is necessary to contrive some adequate means such as provision of a greater number of thyristor elements.

In the arm of another circuit configuration shown in FIG. 2, arresters 21, 22 and 23 are connected in parallel with thyristor elements 1, 2 and 3, respectively. In this structure, the voltage applied to each of the thyristor elements is maintained constant at the limit voltage $V_M$ of each arrester regardless of the number of faulty thyristor elements, so that there exists no necessity of providing additional thyristor elements. However, in case there occurs a phenomenon that, out of total N pieces of thyristor elements connected in series, i pieces of them fail to conduct properly due to any fault of gate circuits or the like associated therewith, a load current comes to flow in the arresters connected in parallel with such nonconducting thyristor elements. For example, when the second thyristor element 2 alone fails to conduct, a voltage which is equal to the voltage for the entire arm is impressed between the anode and cathode of the second thyristor element 2. However, because of connection of the arrester 22 in parallel with the thyristor element 2 and the characteristic of the power converter to forcibly cause flow of a load current, the terminal voltage of the thyristor element 2 is limited to the terminal voltage $V_R$ of the arrester 22 when the load current $I_R$ determined in accordance with the voltage-current characteristic of the arrester 22 flows therethrough, hence avoiding breakdown of the thyristor element 2. In the meanwhile, the arrester possesses merely a current conducting capability for protection of the thyristor element from any overvoltage of lightning impulse, on-off impulse or the like applied for a short period of time. Therefore, under such a condition that a load current flows repeatedly during a relatively long period of time, thermal breakdown occurs immediately. Furthermore, it is not practical in view of economy to provide a particular arrester capable of withstanding a huge power loss derived from flow of a load current.

The structure of a conventional overvoltage limiter supporting an arrester is shown in FIG. 3, in which a pair of disk-like electrodes 27 and 28 are anchored with screws to both ends of an insulator cylinder 31, and an overvoltage limiting element 24 is housed in a casing constituted of such members. The element 24 is pressed against one electrode 27 by means of a spring 29 disposed between the element 24 itself and the other electrode 28 so that the element 24 is electrically connected, at its surface portion being in contact with the spring 29, to the electrode 28 via a shunt 30. In case the overvoltage limiter is employed in the power converter of FIG. 2, one of the electrodes is connected to the anode of the thyristor element while the other electrode to the cathode thereof.

When there occurs an abnormal state in the power converter of FIG. 2 that the thyristor element 2 alone fails to conduct, a load current flows via the electrodes 28, shunt 30, overvoltage limiting element 24 and electrode 27. And continuous flow of such a load current induces thermal breakdown of the overvoltage limiting element 24 to eventually generate arcing in the insulator cylinder 31, hence increasing the internal gas pressure to break the casing as a result. Consequently, the arc between the two electrodes leaks from the casing and causes damage to peripheral components and may further bring about a fatal accident in the entirety of the power converter.

SUMMARY OF THE INVENTION

An object of this invention resides in providing an improved power converter equipped with overvoltage limiters wherein, when one or more of thyristor elements connected in series with one another accidentally fail to conduct and a load current flows in the overvoltage limiting elements connected in parallel with the thyristor elements, a short-circuit path is formed for causing the current to bypass the said overvoltage limiting elements so as to prevent thermal breakdown thereof and any resultant damage that may otherwise be induced to peripheral components.

The power converter according to the present invention is equipped with overvoltage limiters comprising overvoltage limiting elements which are respectively connected in parallel with a plurality of thyristor elements connected in series with one another, and short-circuit means responsive to a load current flowing, upon failure of normal conduction of any thyristor element, in the associated overvoltage limiting element being in parallel connection with the faulty thyristor element, and serving to short-circuit the ends of the said overvoltage limiting element. Due to the operation of the short-circuit means, the load current comes to flow therein instead of flowing through the overvoltage limiting element. Consequently, the overvoltage limiting element is protected with certainty from thermal breakdown that may otherwise be induced by the load current flowing therethrough during a long period of time.

BRIEF DESCRIPTION OF THE DRAWINGS

FIG. 1 is a circuit diagram of one of arms in a conventional power converter;

FIG. 2 is a circuit diagram of one of arms in another known power converter;

FIG. 3 is a vertical sectional view of an overvoltage limiter employed in the conventional power converter;

FIG. 4 is a vertical sectional view of an overvoltage limiter employed in an exemplary power converter according to this invention; and FIG. 5 is a vertical sectional view of the power converter in the state posterior to the operation of short-circuit means.

DETAILED DESCRIPTION OF THE PREFERRED EMBODIMENT

Similarly to the foregoing explanation given in connection with the conventional example of FIG. 2, the power converter according to the present invention is also equipped with a plurality of arms each comprising a plurality of thyristor elements connected in series with one another, wherein snubber circuits and arresters serving as overvoltage limiters are connected in parallel with the thyristor elements respectively. Since the feature of this invention resides in the provision of novel overvoltage limiters, the electric circuit diagram of one of arms in the power converter of the invention becomes exactly equal to FIG. 2. Therefore, the description given previously with regard to FIG. 2 applies to the present invention as well. Each of the arresters 21, 22 and 23 shown in FIG. 2 constitute a principal part of an overvoltage limiter having the structure of FIG. 4.

In FIG. 4, electrodes 27 and 28 are anchored by means of screws or the like to the two ends of an insulator cylinder 31 respectively, thereby constituting a casing to house an overvoltage limiting element 24. This element is kept in contact with the first electrode 27 at its one end face while supporting a metal layer 25 of a low melting point and a plate 26 at its other end face. A spring 29 disposed between the second electrode 28 and the plate 26 serves to press the overvoltage limiting element 24 toward the first electrode 27 via the plate 26 and the metal layer 25. Preferably, a shallow recess having the same shape as the end face of the overvoltage limiting element 24 is formed for effecting stable positioning of the overvoltage limiting element 24. The second electrode 28 and the plate 26 are electrically connected with each other through a shunt 30.

The two electrodes 27 and 28 have cylindrical extended portions 27a and 28a protruding along the inner surface of the insulator cylinder 31, and the fore ends of the portions 27a and 28a are opposed to each other with a predetermined space to form a gap 32 therebetween. The position of the gap 32 is so selected that the axis of the support cylinder 31 in the horizontal attitude illustrated is located immediately below the metal layer 25 of a low melting point.

The metal forming the layer 25 needs to have satisfactory electrical conductivity and a melting point lower than the thermal breakdown temperature of the overvoltage limiting element 24. A typical metal adapted for the layer 25 is tin or an alloy containing the same.

In the circuit diagram of FIG. 2 where the overvoltage limiter of FIG. 4 is employed as each of arresters 21, 22 and 23 in the illustrated attitude with the axis of the insulator cylinder 31 being horizontal, when any momentary high voltage such as lightning impulse or on-off impulse is applied between the terminals 16 and 17, then the overvoltage limiting elements 24 function to suppress the anode-cathode voltage of the thyristor elements 1, 2 and 3 to or below a predetermined threshold level as in the conventional apparatus. If such an overvoltage state is terminated within an extremely short period of time, the resultant power loss in each overvoltage limiting element 24 is not increased much so that the temperature rise in the element 24 is substantially negligible.

Meanwhile, in case that one of the thyristor elements accidentally fails to conduct for a long time due to some fault in the gate circuit associated therewith, it induces an increase of the power consumption in the overvoltage limiting element 24 connected in parallel with the faulty thyristor element, whereby the temperature rises in proportion thereto. When the temperature of the overvoltage limiting element 24 reaches the melting point of the metal layer 25 kept in contact therewith, the metal is molten to flow downward by gravity. Since the gap 32 is existent immediately below the layer 26 as mentioned previously, the metal thus molten flows into the gap 32 to fill the same, thereby electrically connecting the extended portions 27a and 28a with each other as illustrated in FIG. 5.

In the state of FIG. 5, the electrode 27 bypasses the overvoltage limiting element 24 and is connected to the electrode 28 via the molten metal, so that the current passing through the element 24 is reduced substantially to zero. In case the amount of the molten metal having flown into the gap 32 is small, the electric resistance between the extended portions 27a and 28a is high to cause flow of a considerably large amount of current via the overvoltage limiting element 24. Then the temperature of this element further rises due to the current flow thus caused, and the resultant heat is applied to the metal layer 25 to eventually increase the amount of the molten metal introduced into the gap 32, thereby reducing the electric resistance between the portions 27a and 28a.

Although the exemplary arm mentioned above has merely three thyristor elements in order to simplify the explanation, each arm employed in the actual power converter comprises a greater number of thyristor elements connected in series.

As described hereinabove, in the power converter according to this invention, the overvoltage limiters connected in parallel with the thyristor elements respectively are equipped with short-circuit means which functions in response to a load current flowing through the overvoltage limiting elements, so that it becomes possible to achieve effective protection of the overvoltage limiting elements from thermal breakdown as well as to prevent leakage of any arc therefrom that may otherwise cause damage to peripheral components.

What is claimed is:

1. A power converter having a plurality of thyristor elements connected in series with one another and overvoltage limiters each connected between the anode and the cathode of the associated thyristor elements individually, each of said overvoltage limiters comprising an overvoltage limiting element connected between the anode and the cathode of said thyristor element, and means for short-circuiting the ends of said overvoltage limiting element in response to a load current flowing in said overvoltage limiting element, each of said overvoltage limiters comprising a first electrode kept in contact with one end face of said overvoltage limiting element, a metal layer of a low melting point disposed opposite to said first electrode and kept in contact with the other end face of said overvoltage limiting element, a second electrode disposed opposite to said first electrode and connected electrically to said metal layer of a low melting point, a first extended portion protruding from said first electrode toward said second electrode, and a second extended portion protruding from said second electrode toward the fore end of said first extended portion and forming a gap of a predetermined width in relation to said fore end, said gap being so positioned as to be suitable for effecting electrical connection of said first and second extended portions with each other when the metal of a low melting point flows into said gap posterior to becoming molten by the heat generated due to the flow of a load current through said overvoltage limiting element.

2. The power converter as defined in claim 1, wherein said metal layer has a melting point lower than the thermal breakdown temperature of said overvoltage limiting element.

3. The power converter as defined in claim 1, wherein said overvoltage limiter further comprises a conductive plate kept in contact with one surface of said metal layer of a low melting point on the reverse side with respect to the other surface thereof being in contact with said overvoltage limiting element, a spring disposed between said conductive plate and said second electrode, and a shunt for electrically connecting said conductive plate and said second electrode with each other.

4. The power converter as defined in claim 1, wherein said overvoltage limiter further has an insulator cylinder supporting said first and second electrodes at two ends thereof, and said first and second extended portions protrude along the inner surface of said insulator cylinder.

* * * * *